(12) United States Patent
Tsukamoto

(10) Patent No.: US 6,481,547 B2
(45) Date of Patent: Nov. 19, 2002

(54) APPARATUS FOR TAKING UP SLACK OF WIRE HARNESS

(75) Inventor: Masashi Tsukamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/867,436

(22) Filed: May 31, 2001

(65) Prior Publication Data

US 2001/0052442 A1 Dec. 20, 2001

(30) Foreign Application Priority Data

Jun. 2, 2000 (JP) .................................... P.2000-166137
Oct. 16, 2000 (JP) .................................... P.2000-315461

(51) Int. Cl.[7] ............................................. H02G 11/00
(52) U.S. Cl. .................................................. 191/12 R
(58) Field of Search ..................... 191/12 R, 12.2 R, 191/12.4, 125; 174/50, 50.5, 50.51, 50.52, 52.1, 59

(56) References Cited

U.S. PATENT DOCUMENTS

| | | | | | |
|---|---|---|---|---|---|
| 1,815,532 | A | * | 7/1931 | Vesey | 15/104.33 |
| 1,865,069 | A | * | 6/1932 | Allen | 191/12 R |
| 2,160,961 | A | * | 6/1939 | Dorman | 174/135 |
| 2,184,363 | A | * | 12/1939 | Schultz | 137/355.28 |
| 2,470,320 | A | * | 5/1949 | Page | 174/135 |
| 3,089,210 | A | * | 5/1963 | Ritter | 174/135 |
| 3,373,954 | A | * | 3/1968 | Hilsinger | 191/12 R |
| 4,212,421 | A | * | 7/1980 | Scott | 137/355.2 |
| 5,149,017 | A | * | 9/1992 | McEntire et al. | 14/71.5 |
| 5,540,312 | A | * | 7/1996 | Ogawa et al. | 191/12 R |
| 5,720,627 | A | * | 2/1998 | Gillbrand et al. | 191/12 R |
| 5,877,936 | A | * | 3/1999 | Nishitani | 361/600 |

FOREIGN PATENT DOCUMENTS

| | | | |
|---|---|---|---|
| JP | 2-106114 | * | 2/1990 |
| JP | 9-20189 | | 1/1997 |
| JP | 10-76887 | | 3/1998 |

* cited by examiner

Primary Examiner—Mark T. Le
(74) Attorney, Agent, or Firm—Morgan, Lewis & Bockius LLP

(57) ABSTRACT

An apparatus (1A) for taking up the slack of a wire harness takes up the slack of a flexible, flat wire harness (4) which is accommodated in a housing (2A) having a second side plate (9) formed in an inclined manner with respect to a first side plate (5), and which is drawn out of the housing (2A). This second side plate (9) is provided in such a manner as to assume a gradual downward gradient from a first opening (7) side toward a second opening (11) side. The wire harness (4) which is inserted through the first opening (7) is partially bonded to the first side plate (5), is once folded back toward the introducing side, i.e., the first opening (7) side, in a state in which the curvature of bending is practically nil. The wire harness (4) is then turned back toward the second opening (11) side in a state of being curved arcuately by the resilient action of the wire harness (4) itself, and is drawn out of the housing (2A) through the second opening (11).

10 Claims, 8 Drawing Sheets

APPARATUS FOR TAKING UP SLACK OF WIRE HARNESS

BACKGROUND OF THE INVENTION

1. Technical Field of the Invention

The present invention relates to an apparatus for taking up the slack of a wire harness which is drawn out when the door of an automobile, for example, is opened for preventing the occurrence of the slack between the door and the vehicle body when the door is closed.

2. Related Art

Among vehicles such as automobiles, there is a type in which lights and switches are provided on a rear window or door side, and the lights and switches are connected to a control apparatus provided on the vehicle body side by a wire harness or the like. Therefore, if, for example, the door is opened, the wire harness is drawn out from the vehicle body side in accordance with the angle of its opening.

On the other hand, in a case where the door is closed, unless the wire harness is taken up on the vehicle body side, the wire harness remains in the slackened state at the opening/closing position, so that there are possibilities that the wire harness can become disconnected due to being pinched between the door and the vehicle body, or the sheath portion exfoliates, resulting in short-circuit.

To prevent the above-described situation, a "movable wire harness" disclosed in, for example, Japanese unexamined Patent Publication No.hei.9-20189 has been proposed.

This movable wire harness is arranged such that a flat harness is accommodated in an accommodating box in a slackened state, and one end thereof is urged in one direction by a spring. According to this arrangement, if a rear window is opened, the wire harness is drawn out in opposition to the spring, whereas if the rear window is closed, the wire harness is drawn into the accommodating box by the resilient action of the spring, thereby taking up the slack of the wire harness.

However, since the wire -harness is not protected at its drawn-out portion, and since the aforementioned sheath portion is likely to undergo peeling or the like, and a slack is formed in the accommodating box, there has been a problem in that abnormal noise can occur during the traveling of the automobile.

Accordingly, an apparatus for taking up the slack of a wire harness such as the one shown in FIG. 11 has been proposed. It should be noted that the illustrated apparatus for taking up the slack of a wire harness is disclosed in Japanese Unexamined Patent Publication No. Hei.10-76887 as an "expanding and contracting structure for a circuit member for a door."

Namely, a pair of elongated guide slots 71 for guiding the sliding of a harness protector 67 are respectively formed longitudinally in a pair of upper and lower walls 62 of a harness accommodating case 61, and a pair of short guide holes 72 for respectively supporting two guide rollers 63 are formed in the upper and lower walls 62 at positions close to front ends thereof slightly arcuately in a direction perpendicular to the guide slot 71. Each of the upper and lower walls 62 is gradually enlarged in width toward the front along a tapered wall 65, and is substantially enlarged on the front end side to form the guide hole 72. In addition, the upper and lower walls 62 have the function as guide members with respect to the protector 67.

A pair of guide roller assemblies 80 are respectively disposed on the upper and lower sides of the protector 67. In addition, a flat wire harness 64 is bent substantially in an S-shape via a fixing portion 66, is passed through the guide rollers 63 and support rollers 75, is wired along the inner surface of a side wall of the protector 67, and is connected to a connector 68 at the tip of the protector. In addition, the support rollers 75 are in contact with the outer surface of a protector side wall 77, while the guide rollers 63 are in contact with the wire harness 64.

A pair of upper and lower slide shafts 81 for the harness accommodating case 61 are respectively provided so as to project from rear ends of upper and lower walls 78 of the protector 67. In addition, the connector 68 is connected to a connector 98 of a wire harness 97 on a vehicle body 96 side. When the door is opened or closed, the protector 67 is swung to the left and right with the rear-end slide shafts 81 as fulcrums. Accordingly, the elongated guide holes 72 for shafts 76 of a pair of brackets 73 which swing integrally with the protector 67 are required.

In accordance with the above-described construction, when the protector retracts into the harness accommodating case 61 along the guide slots 71 during the closing of the door, a rack 79 rotates a pinion gear (provided at one end of the guide roller 63), so that the guide roller 63 rotates integrally with the pinion gear. Consequently, the wire harness 64 is forcibly pulled into the harness accommodating case 61. The guide roller 63 rotates without imparting a gap between the wire harness 64 and the protector 67, and smoothly accommodates the wire harness 64 with practically no frictional resistance at the time of accommodation.

However, the above-described expanding and contracting structure for a circuit member for a door has the following problem. Namely, to accommodate the protector, the housing for accommodating the aforementioned expanding and contracting structure, i.e., the housing making up the apparatus for taking up the slack, becomes equal to or greater in length than the expanding and contacting stroke of the wire harness, so that there is a problem in that it is difficult to make compact the apparatus for taking up the slack.

In addition, since the positioning is effected by making use of the resiliency of the wire harness itself, if vibrations are applied to the wire harness in conjunction with the traveling of the automobile, for example, there are cases where the wire harness vibrates and the abnormal noise occurs. Furthermore, there has been a problem in that the structure is complex and the number of component parts is large, leading to higher cost.

SUMMARY OF THE INVENTION

The present invention has been devised in view of the above-described problems, and its object is to provide an apparatus for taking up the slack of a wire harness which makes it possible to make compact the overall apparatus for taking up the slack of a wire harness, simplify its structure, prevent the occurrence of abnormal noise due to the slackening of the wire harness, and improve the assembling efficiency.

The above object of the invention is overcome by the apparatus for taking up the slack of a wire harness described in (1) to (9) below.

(1) An apparatus for taking up the slack of a wire harness which is formed by a housing including a first opening for introducing a wire harness, a second opening for leading out the wire harness, and a wire-harness accommodating space for accommodating therein the wire harness in a bent state, characterized in that the second opening of the housing is formed at an end portion of the housing Where a first side plate for forming a bottom surface of the housing and a second side plate for forming an inclined surface are brought close together; that the second side plate is formed in such a manner as to gradually approach the first side plate from a first opening side toward the second opening; and that the extension of the wire harness and the taking up of the slack of the wire harness are effected in a state in which the wire harness in the housing is in resiliently sliding contact with an inner side surface of the first side plate or the second side plate as an end portion of the wire harness led out from the second opening is drawn out or pushed in.

(2) In the apparatus for taking up the slack of a wire harness according to (1) above, the above-described apparatus for taking up the slack of a wire harness is characterized in that a portion of the wire harness led out from the first opening is secured to the inner side surface of the first side plate, and that the end portion thereof is folded back toward the first opening side and is turned back in a curved state toward a second opening side, so as to allow a portion of the wire harness to be brought into resilient contact with the inner side surface of the second side plate.

In accordance with the apparatus for taking up the slack of a wire harness having the above-described construction, when the led-out end portion of the wire harness is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the second side plate. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surface of the second side plate. Thus the wire harness is taken up into the housing in correspondence with the enlarged-radius portion, thereby effecting the taking up of the slack. Namely, the wire harness in the reduced-radius state has a large restoring force due to the resilient action of the wire harness itself as compared with the wire harness in an enlarged-radius state, so that the longer the wire harness is drawn out, the more the force for pulling the wire harness into the housing increases. Accordingly, abnormal noise does not occur due to the vibrations and the like, and when the wire harness is pushed in, the slack can be taken up smoothly into the housing.

(3) In the apparatus for taking up the slack of a wire harness according to (1) above, the above-described apparatus for taking up the slack of a wire harness is characterized in that a portion of the wire harness led out from the first opening is secured to the inner side surface of the second side plate, and that the end portion thereof is folded back toward the first opening side and is turned back in a curved state toward a second opening side, so as to allow a portion of the wire harness to be brought into resilient contact with the inner side surface of the first side plate.

In accordance with the above-described apparatus for taking up the slack of a wire harness, when the led-out end portion of the wire harness is drawn out of the housing through the second opening, in the same way as described above, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the first side plate. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surface of the first side plate. Thus the wire harness is taken up into the housing in correspondence with the enlarged-radius portion, thereby effecting the taking up of the slack.

(4) In the apparatus for taking up the slack of a wire harness according to (1) above, the above-described apparatus for taking up the slack of a wire harness is characterized in that the second opening also serves as the first opening, and that a portion of the wire harness led out from the second opening is secured to the inner side surface of the first side plate, and is turned back in a curved state toward a second opening side inside the housing, so as to allow a portion of the wire harness to be brought into resilient contact with the inner side surface of the second side plate and to be led out from the second opening.

In accordance with the above-described apparatus for taking up the slack of a wire harness, as the end portion of the wire harness led out from the second opening is drawn out and pushed in, the extension of the wire harness and the taking up of the slack of the wire harness can be effected through the operation similar to that of the apparatus for taking up the slack of a wire harness according to (3) above.

(5) In the apparatus for taking up the slack of a wire harness according to (1) above, the above-described apparatus for taking up the slack of a wire harness is characterized in that the second opening also serves as the first opening, and that a portion of the wire harness led out from the second opening is turned back in a curved state toward a second opening side without being secured inside the housing, so as to allow the wire harness to be brought into resilient contact with the inner side surfaces of the first side plate and the second side plate and to be led out from the second opening, the extension of the wire harness and the taking up of the slack of the wire harness being effected by the drawing out and the pushing in of both or either one of an introduced end and a led-out end of the wire harness.

In accordance with the apparatus for taking up the slack of a wire harness having the above-described construction, since the wire harness is not secured inside the housing, the wire harness in the housing is in resilient contact with the inner side surfaces of the first side plate and the second side plate. As both or either one of both end portions of the wire harness led out from the second opening is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surfaces of the first side plate and the second side plate. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surfaces of the first side plate and the second side plate. Thus the wire harness is taken up into the housing in correspondence with the enlarged-radius portion, thereby effecting the taking up of the slack.

(6) An apparatus for taking up the slack of a wire harness including a first opening for introducing a wire harness, a second opening for leading out the wire harness, and a housing for accommodating therein the wire harness in a bent state, characterized in that the second opening also functions as the first opening, and a pair of side plates forming inclined surfaces are disposed in face-to-face relation to each other so as to gradually approach each other toward a second opening side; and that the extension of the wire harness and the taking up of the slack of the wire harness are effected in a state in which the wire harness in the housing is in resiliently sliding contact with inner side surfaces of the side plates as both or either one of portions of the wire harness introduced through and led out from the second opening is drawn out or pushed in.

In accordance with the apparatus for taking up the slack of a wire harness having the above-described construction, since a pair of side plates are disposed in face-to-face relation to each other so as to gradually approach each other toward a second opening side, the wire harness in the housing is in resilient contact with the inner side surfaces of the two side plates. As both or either one of both end portions of the wire harness led out from the second opening is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surfaces of the two side plates. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surfaces of the two side plates. Thus the wire harness is taken up into the housing in correspondence with the enlarged-radius portion, thereby effecting the taking up of the slack. Accordingly, when the wire harness is pushed in, the slack can be taken up smoothly into the housing.

(7) An apparatus for taking up the slack of a wire harness which is formed by a housing including a first opening from which one end of a wire harness is led out and where the one end of the wire harness is fixed, a second opening for leading out the wire harness, and a wire-harness accommodating space for accommodating therein the wire harness in a bent state, characterized in that the second opening of the housing is formed at an end portion of the housing where a first side plate for forming a bottom surface of the housing and a second side plate for forming an inclined surface are brought close together; that the second side plate is formed in such a manner as to gradually approach the first side plate toward the second opening from an end portion of a top plate formed so as to oppose the first side plate; that connecting terminals are provided at an end portion of the wire harness led out from the first opening, and a connector housing in which the connecting terminals are fixed in a terminal accommodating chamber is molded integrally on an outer side of the housing; and that the extension of the wire harness and the taking up of the slack of the wire harness are effected in a state in which the wire harness in the housing is in resiliently sliding contact with an inner side surface of the first side plate as an end portion of the wire harness led out from the second opening is drawn out or pushed in.

In accordance with the apparatus for taking up the slack of a wire harness having the above-described construction, when the led-out end portion of the wire harness is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the first side plate. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surface of the first side plate. Thus the wire harness is taken up into the housing in correspondence with the enlarged-radius portion, thereby effecting the taking up of the slack. Accordingly, abnormal noise does not occur due to the vibrations and the like, and when the wire harness is pushed in, the slack can be taken up smoothly into the housing.

Further, since the connecting terminals are provided at an end portion of the wire harness led out from the first opening, and the connector housing in which the connecting terminals are fixed in the terminal accommodating chamber is molded integrally on the outer side of the housing, it is unnecessary to provide a fixing member for the wire harness, in the vicinity of the first opening, and a member for attaching the connector for connection to the wire harness is also unnecessary. Therefore, it is possible to reduce the number of component parts.

(8) In the apparatus for taking up the slack of a wire harness according to (7) above, the above-described apparatus for taking up the slack of a wire harness is characterized in that the housing is comprised of a cover member with which the connector housing is molded integrally and a bottom member for forming the wire-harness accommodating space by being fitted to the cover member from a width wise direction of the wire harness.

In accordance with the apparatus for taking up the slack of a wire harness having the above-described construction, the housing is comprised of two component parts including the cover member and the bottom member. After the connecting terminals at the end portion of the wire harness are fixed in the terminal accommodating chamber inside the connector housing molded integrally on the cover member, the wire harness is curved so as to be accommodated within the housing. Next, as the bottom member is fitted to the cover member from the width wise direction of the wire harness, the bottom member can be easily assembled to the cover member in a state in which the wire harness is accommodated, and the wire harness can be led out from the second opening at the same time as the fitting. Accordingly, it is possible to improve the assembling operation.

(9) In the apparatus for taking up the slack of a wire harness according to (7) or (8) above, the above-described apparatus for taking up the slack of a wire harness is characterized in that the connector housing is formed on an inclined surface of the second side plate.

In accordance with the apparatus for taking up the slack of a wire harness having the above-described construction, since the connector housing is molded integrally on the inclined surface, the space for installing the overall apparatus, including the space for engaging with the mating connector, is not made large and can be minimized.

DETAILED DESCRIPTION OF PREFERRED EMBODIMENT

First Embodiment

Figure 1:
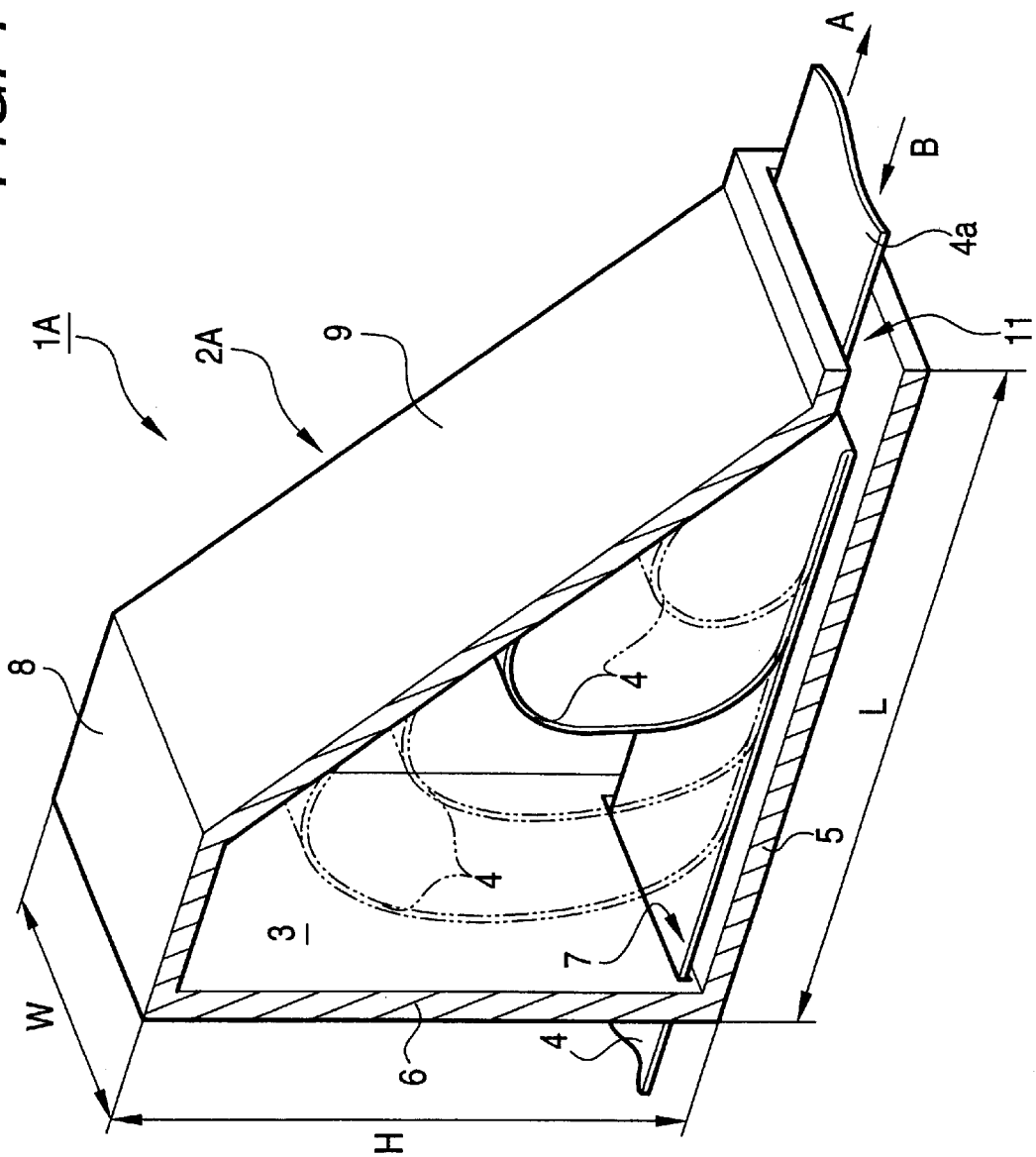
FIG. 1 is a perspective view illustrating a first embodiment of an apparatus for taking up the slack of a wire harness in accordance with the invention.
Figure 2:
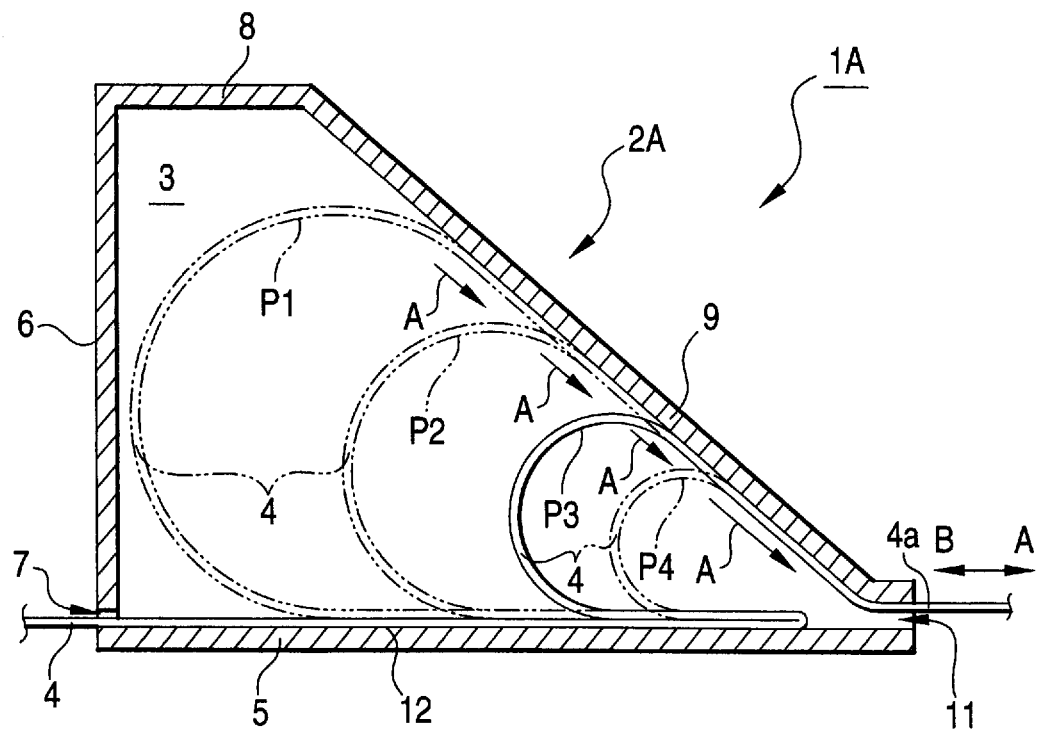
FIG. 2 is a cross-sectional view illustrating the construction and operation of the apparatus for taking up the slack of a wire harness shown in FIG. 1.

Referring now to FIGS. 1 and 2, a detailed description will be given of a first embodiment of an apparatus for taking up the slack of a wire harness in accordance with the invention. FIG. 1 is a perspective view illustrating the construction and operation of the apparatus for taking up the slack of a wire harness in accordance with this embodiment, and FIG. 2 is a cross-sectional view illustrating the drawing out (extension) of the wire harness and the slack taking-up operation.

An apparatus 1A for taking up the slack of a wire harness (hereinafter simply abbreviated as the slack taking-up apparatus) shown in FIGS. 1 and 2 comprises a housing 2A whose vertical cross-sectional shape formed in a substantially trapezoidal shape, and a flexible flat wire harness (hereinafter simply abbreviated as the wire harness) 4 which is accommodated in a bent state in a wire-harness accommodating space 3 in the housing 2A and is drawn out of the housing 2A.

The housing 2A has a first side plate 5 serving as a bottom plate, a vertical side plate 6 formed so as to stand upright from the first side plate 5, a top plate 8 formed so as to oppose the first side plate 5 in parallel, and a second side plate 9 formed in an inclined manner with respect to the first side plate 5. The housing 2A further has a first opening 7 for introducing the wire harness 4 into the wire-harness accommodating space 3 and a second opening 11 for leading out the wire harness 4 in the wire-harness accommodating space 3.

In addition, the second side plate 9 is provided so as to form a gradual downward gradient from the front end of the top plate 8 formed at the upper end of the vertical side plate 6 toward the second opening 11 formed on the right-hand side in the drawings. Accordingly, the shape of the wire-harness accommodating space 3 in the housing 2A is formed such that the space on the first opening 7 side is large, and the space becomes gradually smaller toward the second opening 11 side. In other words, the wire-harness accommodating space 3 has a tapered shape.

In addition, the length L and the height H of the housing 2A is set in correspondence with the taking-up length of the wire harness 4, and the width W thereof is set to be slightly wide in correspondence with the transverse width of the wire harness 4.

Further, the first opening 7 is formed at one end of the housing 2A, i.e., at a lower portion on the left-hand side in the drawings. The second opening 11 is formed at the other end of the housing 2A, i.e., at a lower portion on the right-hand side in the drawings at a position corresponding to a portion where the first side plate 5 and the second side plate 9 are brought close together. It should be noted that the housing 2A may have a sealed structure or a partially open structure.

As shown in FIG. 2, a portion of the wire harness 4 inserted into the wire-harness accommodating space 3 from the first opening 7 is bonded to the flat side surface of the first side plate 5 by an adhesive 12, and is once folded back toward the introducing side, i.e., the first opening 7 side, in a state in which the curvature of bending is practically nil. The wire harness 4 is then turned back toward the second opening 11 side in a state of being curved arcuately by its own resilient action, and is drawn out of the housing 2A through the second opening 11. At this time, a wire harness end portion 4a is drawn out along the second side plate 9 in a state the wire harness 4 is in surface contact with the inner side surface of the second side plate 9. Consequently, in its route starting from the position where the wire harness 4 is bent and leading to the second opening 11, the wire harness 4 undergoes flexural deformation in a curved manner as shown in the drawings, while urging the inner side surface of the second side plate 9 by the resiliency of the wire harness itself.

Accordingly, although the wire harness 4 is in surface contact with the inner side surface of the second side plate 9, the wire harness 4 is merely in contact with it by the resiliency of the wire harness 4 itself. Hence, for this reason, coupled with the fact that the gradient of the second side plate 9 is set so as to extend along the flexural deformation of the wire harness 4, the wire harness 4 is able to slide smoothly along the inner side surface of the second side plate 9.

Next, a description will be given of the operation of the above-described apparatus 1A for taking up the slack of a wire harness.

As shown in FIG. 2, if the end portion 4a of the wire harness 4 is connected to the unillustrated door of an automobile, for example, the wire harness 4 is drawn out from the second opening 11 in the direction of arrow A as the door is opened. At this time, since the wire harness 4 at the side plate 5 side is fixed, as for the wire harness 4 which was initially curved largely at a position P1 on the left-hand side in the drawing, the radius of the curved portion is gradually reduced as shown at positions P2, P3, and P4 in correspondence with the angle of opening of the door. At this time, since a portion of the wire harness 4 moves while lightly coming into contact with the inner side surface of the second side plate 9 in correspondence with its resiliency, that portion of the wire harness 4 does not lose its form and is smoothly drawn out while applying an appropriate urging force to the second side plate 9. It should be noted that this urging force, i.e., the restoring force of the wire harness, is not fixed, and gradually increases as the radius of the curved portion is reduced.

Next, when the door or the like is closed, the wire harness 4 is pushed into the wire-harness accommodating space 3 inside the housing 2A through the second opening 11 in the direction of arrow B in correspondence with the movement of the door. Consequently, the curved portion of the wire harness 4 bulges so as to undergo gradual enlargement of its radius as shown in the order of the positions P4, P3, P2, and P1 contrary to the time of drawing out, and the amount of the wire harness 4 accommodated in the wire-harness accommodating space 3 increases in correspondence with this bulging, thereby taking up the slack. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, at the point of time when the door is completely closed, the wire harness 4 is taken up in the housing 2A without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable slack taking-up apparatus. Additionally, since the structure is simple and a member such as a spring is not required at all, it is possible to attain reduction in cost.

Second Embodiment

Figure 3:
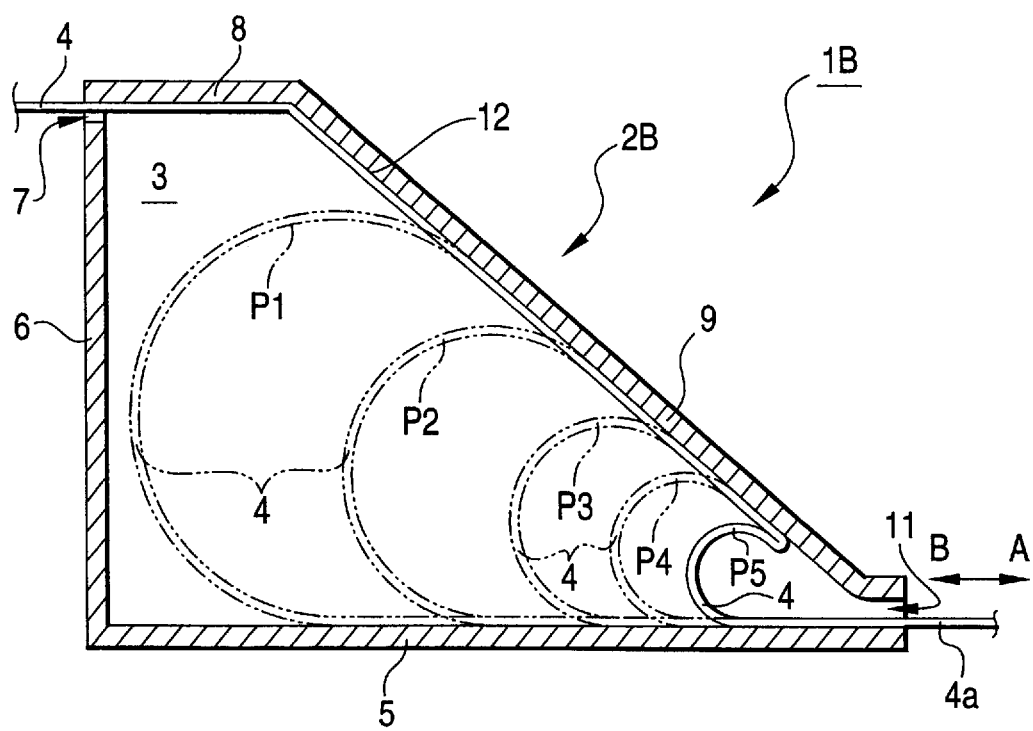
FIG. 3 is a cross-sectional view illustrating the construction and operation of a second embodiment of the apparatus for taking up the slack of a wire harness in accordance with the invention.

Next, referring to FIG. 3, a detailed description will be given of a second embodiment of the apparatus for taking up the slack of a wire harness in accordance with the invention. FIG. 3 is a cross-sectional view illustrating the drawing out (extension) of the wire harness and the slack taking-up operation. It should be noted that since the major difference between this embodiment and the above-described first embodiment lies in that the position where the wire harness 4 is introduced into a housing 2B as well as its bonded position are changed, the members which function in the same way as described above will be denoted by the same reference numerals, and a description thereof will be omitted.

In an apparatus 1B for taking up the slack of a wire harness in this embodiment, the first opening 7 is formed at the upper end of the vertical side plate 6, and the wire harness 4 introduced from the first opening 7 is installed up to a vicinity of the second opening 11 along the top plate 8 and the second side plate 9, and is bonded by the adhesive 12.

The wire harness 4 is once folded back toward the introducing side, i.e., the first opening 7 side, in a state in which the curvature of bending is practically nil. The wire harness 4 is then turned back toward the second opening 11 side in a state of being curved arcuately by its own resilient action, and is drawn out of the housing 2B through the second opening 11. At this time, a wire harness end portion 4a is drawn out along the first side plate 5 in a state the wire harness 4 is in surface contact with the inner side surface of the first side plate 5. Consequently, in its route starting from the position where the wire harness 4 is bent and leading to the second opening 11, the wire harness 4 undergoes flexural deformation in a curved manner as shown in the drawing, while urging the inner side surface of the first side plate 5 by the resiliency of the wire harness itself.

Accordingly, although the wire harness 4 is in surface contact with the inner side surface of the first side plate 5, the wire harness 4 is merely in contact with it by the resiliency of the wire harness 4 itself. If the first side plate 5 is viewed by using the second side plate 9 as a reference, there is no difference in the fact that the gradient of the first side plate 5 with respect to the second side plate 9 is set so as to extend along the flexural deformation of the wire harness 4, so that the wire harness 4 is able to slide smoothly along the inner side surface of the first side plate 5 in the same way as the first embodiment.

Next, a description will be given of the operation of the above-described apparatus 1B for taking up the slack of a wire harness.

First, if the end portion 4a of the wire harness 4 is connected to the unillustrated door of an automobile, for example, in the same way as the first embodiment, the wire harness 4 is drawn out from the second opening 11 in the direction of arrow A as the door is opened. At this time, since the first side plate 5 side of the wire harness 4 is fixed, the wire harness 4 initially curved largely at a position P1 on the left-hand side in the drawing is drawn out smoothly while applying an appropriate urging force to the first side plate 5 without losing its form as the radius of the curved portion is gradually reduced as shown at the positions P2, P3, P4, and P5 in correspondence with the angle of opening of the door. At this time, a portion of the wire harness 4 initially moves while lightly coming into surface contact with the inner side surface of the first side plate 5 by the resiliency of the wire harness itself, and its urging force gradually increases as the radius of the curved portion is reduced.

Next, when the door or the like is closed, the wire harness 4 is pushed into the wire-harness accommodating space 3 inside the housing 2B through the second opening 11 in the direction of arrow B in correspondence with the movement of the door. Consequently, the curved portion of the wire harness 4 bulges so as to undergo gradual enlargement of its radius as shown in the order of the positions P4, P3, P2, and P1 from the position P5 contrary to the time of drawing out, and the amount of the wire harness 4 accommodated in the wire-harness accommodating space 3 increases in correspondence with this bulging, thereby taking up the slack. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, at the point of time when the door is completely closed, the wire harness 4 is taken up in the housing 2B without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable apparatus for taking up the slack of a wire harness. Additionally, since the structure is simple and the number of component parts is small, it is possible to attain reduction in cost.

Third Embodiment

Figure 4:
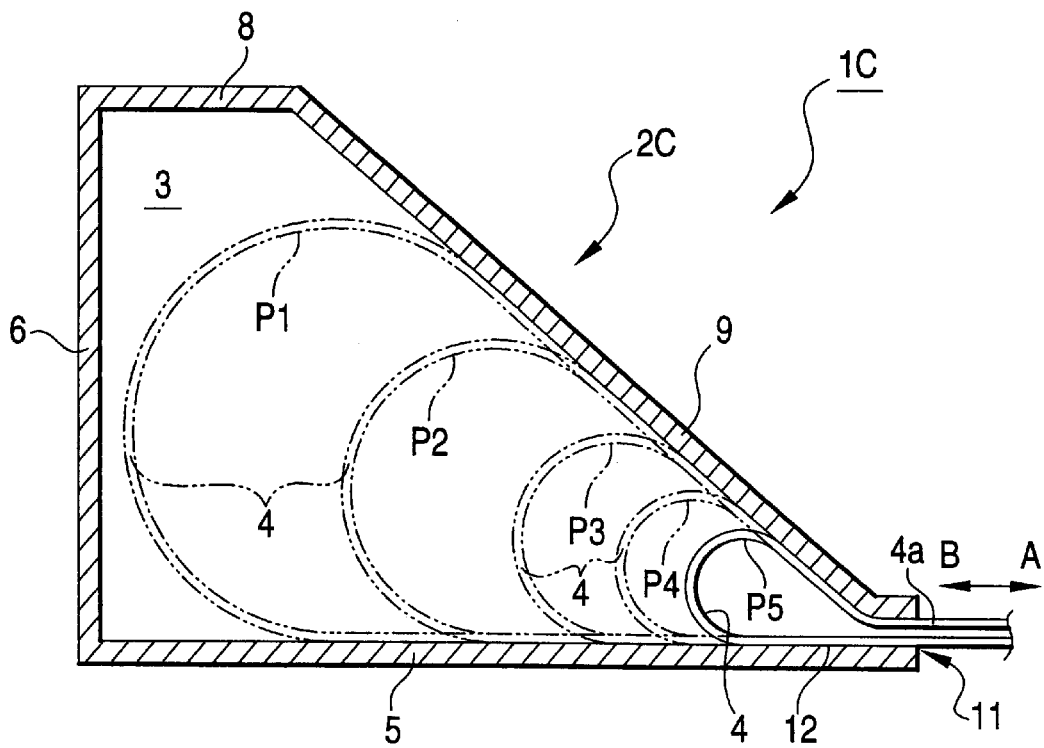
FIG. 4 is a cross-sectional view illustrating the construction and operation of a third embodiment of the apparatus for taking up the slack of a wire harness in accordance with the invention.

Next, referring to FIG. 4, a detailed description will be given of a third embodiment of the apparatus for taking up the slack of a wire harness in accordance with the invention. FIG. 4 is a cross-sectional view illustrating the drawing out (extension) of the wire harness and the slack taking-up operation. It should be noted that the major difference between this embodiment and the above-described embodiments lies in that the introduction of the wire harness 4 into a housing 2C and the leading of the wire harness 4 out of it are effected through the single opening 11. Accordingly, those members that function in the same way as described above will be denoted by the same reference numerals, and a description thereof will be omitted.

In an apparatus 1C for taking up the slack of a wire harness in this embodiment, although the first side plate 5, the vertical side plate 6, the top plate 8, and the second side plate 9 are arranged in the same way as those of the foregoing embodiments, the first opening is not provided. The introduction and the leading out of the wire harness 4 are effected through the single second opening 11.

The wire harness 4 introduced through the opening 11 is bonded in the vicinity of the opening 11 by the adhesive 12. In this embodiment, unlike the above-described embodiments, the wire harness 4 is not folded back with practically no curvature of bending, but extends straightly and is brought in surface contact with the inner side surface of the second side plate 9 in a state of being curved arcuately by the resilient action of the wire harness 4 itself, and its end portion 4a, while moving along the second side plate 9, is drawn out of the housing 2C through the same opening 11. Consequently, the turned-back portion starting from the bonded position of the wire harness 4 and leading to the opening 11 undergoes flexural deformation in a curved manner as shown in the drawing, while urging the inner side surface of the second side plate 9 by the resiliency of the wire harness itself.

Accordingly, although the wire harness 4 is in surface contact with the inner side surface of the second side plate 9, the wire harness 4 is merely in contact with it by the resiliency of the wire harness 4 itself. For this reason, coupled with the fact that the gradient of the second side plate 9 is set so as to extend along the flexural deformation of the wire harness 4, the wire harness 4 is able to slide smoothly along the inner side surface of the second side plate 9 in the same way as the first embodiment.

Next, a description will be given of the operation of the above-described apparatus 1C for taking up the slack of a wire harness.

If the end portion 4a of the wire harness 4 is connected to the unillustrated door of an automobile, for example, in the same way as the first embodiment, the wire harness 4 is drawn out from the opening 11 in the direction of arrow A as the door is opened. At this time, since the first side plate 5 side of the wire harness 4 is fixed, the wire harness 4 initially curved largely at the position P1 on the left-hand side in the drawing is drawn out smoothly while applying an appropriate urging force to the second side plate 9 as the radius of the curved portion is gradually reduced as shown at the positions P2, P3, P4, and P5 in correspondence with the angle of opening of the door. At this time, a portion of the wire harness 4 initially moves while lightly coming into surface contact with the inner side surface of the second side plate 9 by the resiliency of the wire harness itself, and its urging force gradually increases as the radius of the curved portion is reduced.

Next, when the door or the like is closed, the wire harness 4 is pushed into the wire-harness accommodating space 3 inside the housing 2C through the opening 11 in the direction of arrow B in correspondence with the movement of the door. Consequently, the curved portion of the wire harness 4 undergoes expansion of its radius so as to gradually bulge largely as shown in the order of the positions P4, P3, P2, and P1 from the position P5 contrary to the time of drawing out, and the amount of the wire harness 4 accommodated in the wire-harness accommodating space 3 increases in correspondence with this enlargement of the radius, thereby taking up the slack. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, at the point of time when the door is completely closed, the wire harness 4 is taken up in the housing 2C without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable apparatus for taking up the slack of a wire harness. Additionally, since the structure is simple and the number of component parts is small, it is possible to attain reduction in cost.

Fourth Embodiment

Figure 5:
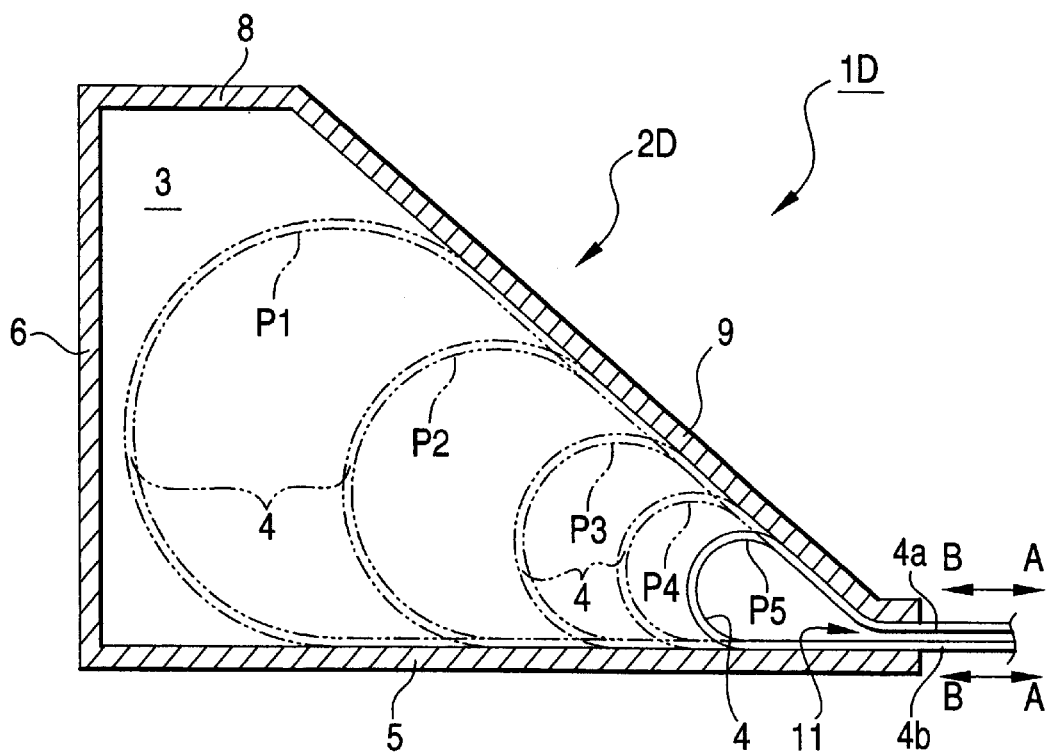
FIG. 5 is a cross-sectional view illustrating the construction and operation of a fourth embodiment of the apparatus for taking up the slack of a wire harness in accordance with the invention.

Next, referring to FIG. 5, a detailed description will be given of a fourth embodiment of the apparatus for taking up the slack of a wire harness in accordance with the invention. FIG. 5 is a cross-sectional view illustrating the drawing out (extension) of the wire harness and the slack taking-up operation. It should be noted that, in terms of the major differences between this embodiment and the above-described embodiments, this apparatus is constructed such that the introduction of the wire harness 4 into a housing 2D and the leading of the wire harness 4 out of it are effected through a single opening, and that the introduction and the pushing in are effected by slidable both end portions without fixing the wire harness 4. Accordingly, those members that function in the same way as described above will be denoted by the same reference numerals, and a description thereof will be omitted.

Namely, in an apparatus 1D for taking up the slack of a wire harness in this embodiment, although the first side plate 5, the vertical side plate 6, the top plate 8, and the second side plate 9 are arranged in the same way as those of the foregoing embodiments, but the first opening 7 is not provided in the same way as the above-described third embodiment. The introduction and the leading out of the wire harness 4 are effected through the single opening 11; however, the wire harness 4 is not fixed inside the housing 2D. Accordingly, the drawing out and the pushing in of the wire harness 4 can be effected by making both or either one of the slidable both end portions movable.

The wire harness 4 introduced from the opening 11 is not bonded unlike the above-described embodiments. Then, inside the wire-harness accommodating space 3 in the housing 2D, the wire harness 4 curved arcuately by the resilient action of the wire harness itself is brought in surface contact with the inner side surfaces of the first side plate 5 and the second side plate 9, and its end portions 4a and 4b, while moving along the inner side surfaces of the first side plate 5 and the second side plate 9, are drawn out of the housing 2D through the opening 11. Consequently, the wire harness 4 undergoes flexural deformation in a curved manner as shown in the drawing, while urging the inner side surfaces of the first side plate 5 and the second side plate 9 by the resiliency of the wire harness itself.

Accordingly, although the wire harness 4 is in surface contact with the inner side surfaces of the first side plate 5 and the second side plate 9, the wire harness 4 is merely in contact with them by the resiliency of the wire harness 4 itself. For this reason, coupled with the fact that the gradient of the second side plate 9 is set so as to extend along the flexural deformation of the wire harness 4, the wire harness 4 is able to slide smoothly along the inner side surfaces of the first side plate 5 and the second side plate 9.

Next, a description will be given of the operation of the above-described apparatus 1D for taking up the slack of a wire harness.

When both (or either one) of the opposite end portions 4a and 4b of the wire harness 4 are drawn out in the direction of the arrow A, the wire harness 4 inside the housing 2D in terms of its bulged state undergoes gradual reduction in its radius from the position P1 in the order of the positions P2, P3, P4, and P5. Namely, the wire harness 4 initially curved largely at the position P1 on the left-hand side in the drawing is drawn out smoothly while applying appropriate urging forces to the first side plate 5 and the second side plate 9 as the radius of the curved portion is gradually reduced as shown at the positions P2, P3, P4, and P5. At this time, the sliding portions of the wire harness 4 initially move while lightly coming into surface contact with the inner side surfaces of the first side plate 5 and the second side plate 9 by the resiliency of the wire harness itself, and their urging forces gradually increase as the radius of the curved portion is reduced.

Next, when both (or either one) of the opposite end portions 4a and 4b of the wire harness 4 are pushed in the direction of the arrow B, the wire harness 4 is pushed into the wire-harness accommodating space 3 inside the housing 2D through the opening 11. Consequently, the curved portion of the wire harness 4 undergoes expansion of its radius so as to gradually bulge largely as shown in the order of the positions P4, P3, P2, and P1 from the position P5 contrary to the time of drawing out, and the amount of the wire harness 4 accommodated in the wire-harness accommodating space 3 increases in correspondence with this enlargement of the radius, thereby taking up the slack. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, the wire harness 4 is taken up in the housing 2D without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable apparatus for taking up the slack of a wire harness. Additionally, since partial bonding of the wire harness is not necessary, and the structure is simple with a small number of component parts, it is possible to attain reduction in cost.

Fifth Embodiment

Figure 6:
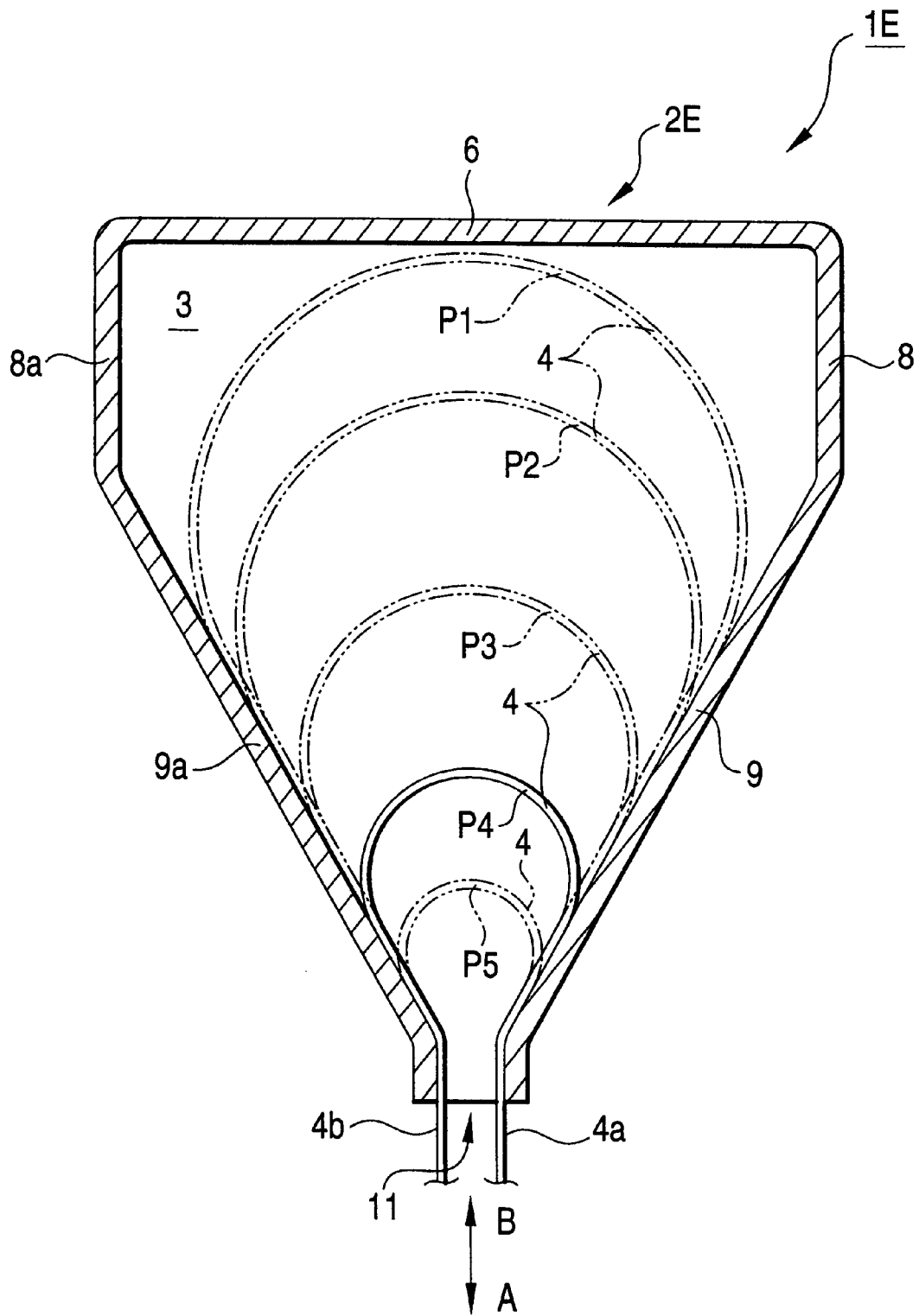
FIG. 6 is a cross-sectional view illustrating the construction and operation of a fifth embodiment of the apparatus for taking up the slack of a wire harness in accordance with the invention.

Next, referring to FIG. 6, a detailed description will be given of a fifth embodiment of the apparatus for taking up the slack of a wire harness in accordance with the invention. FIG. 6 is a cross-sectional view illustrating the drawing out (extension) of the wire harness and the slack taking-up operation. It should be noted that, in terms of the major differences between this embodiment and the above-described embodiments, this apparatus is constructed such that a pair of opposing side plates 9 and 9a making up a housing 2E are made to gradually approach the opening 11 to form a pair of inclined surfaces, that the introduction of the wire harness 4 into the housing 2E and the leading of the wire harness 4 out of it are effected through the single opening 11, and that the introduction and the pushing in are effected through slidable both end portions without fixing the wire harness 4. Accordingly, those members that function in the same way as described above will be denoted by the same reference numerals, and a description thereof will be omitted.

Namely, in an apparatus 1E for taking up the slack of a wire harness in this embodiment, its housing 2E is arranged such that a second inclined portion formed by a parallel plate 8a and the side plate 9a is provided instead of the first side plate shown in the above-described embodiments, so as to be symmetrical with the parallel plate 8 and the side plate 9 making up a first inclined portion. The introduction and the leading out of the wire harness 4 are effected through the single opening 11 in the same way as the above-described embodiments; however, since the wire harness 4 is not bonded inside the housing 2E, the drawing out and the pushing in of the wire harness 4 can be effected by both or either one of the opposite end portions of the wire harness 4.

The wire harness 4 introduced from the opening 11 is not fixed in the same way as the foregoing embodiment. Inside the wire-harness accommodating space 3, the wire harness 4 is brought in surface contact with the inner side surfaces of the two opposed and inclined side plates 9 and 9a in a state of being curved arcuately by the resiliency of the wire harness 4 itself, and its end portions 4a and 4b, while moving along the inner side surfaces, are drawn out of the housing 2E through the opening 11. Consequently, the wire harness 4 undergoes flexural deformation in a curved manner as shown in the drawing, while urging the inner side surfaces of the opposing side plates 9 and 9a by the resiliency of the wire harness itself.

Accordingly, although the wire harness 4 is in surface contact with the inner side surfaces of the side plates 9 and 9*a*, the wire harness 4 is merely in contact with them by the resiliency of the wire harness 4 itself. For this reason, coupled with the fact that the gradient of the side plates 9 and 9*a* is set so as to extend along the flexural deformation of the wire harness 4, the wire harness 4 is able to slide smoothly along the inner side surfaces of the side plates 9 and 9*a*.

Next, a description will be given of the operation of the above-described apparatus 1E for taking up the slack of a wire harness.

When both (or either one) of the opposite end portions 4*a* and 4*b* of the wire harness 4 are drawn out in the direction of the arrow A, in terms of its bulged state the wire harness 4, which is not partially bonded, undergoes gradual reduction in its radius from the position P1 in the order of the positions P2, P3, P4, and P5 in the same way as the foregoing embodiment. Namely, the wire harness 4 which was initially curved largely at the position P1 on the upper side in the drawing is drawn out smoothly while applying appropriate urging forces to the side plates 9 and 9*a* as the radius of the curved portion is gradually reduced as shown at the positions P2, P3, P4, and P5. At this time, the sliding portions of the wire harness 4 initially move while lightly coming into surface contact with the inner side surfaces of the side plates 9 and 9*a* by the resiliency of the wire harness itself, and their urging forces with respect to the inner side surfaces gradually increase as the radius of the curved portion is reduced.

Next, when both (or either one) of the opposite end portions 4*a* and 4*b* of the wire harness 4 are pushed in the direction of the arrow B, since the wire harness 4 is not bonded, the wire harness 4 is pushed into the wire-harness accommodating space 3 inside the housing 2E through the opening 11. Consequently, the wire harness 4 gradually bulges largely in the order of the positions P4, P3, P2, and P1 from the position P5 contrary to the time of drawing out, and the slack of the wire harness 4 is taken up into the wire-harness accommodating space 3 in correspondence with this bulging. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, the wire harness 4 is taken up in the housing 2E without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable apparatus for taking up the slack of a wire harness. Additionally, since partial bonding of the wire harness is not necessary, and the structure is simple with a small number of component parts, it is possible to attain reduction in cost.

Sixth Embodiment

Figure 7:
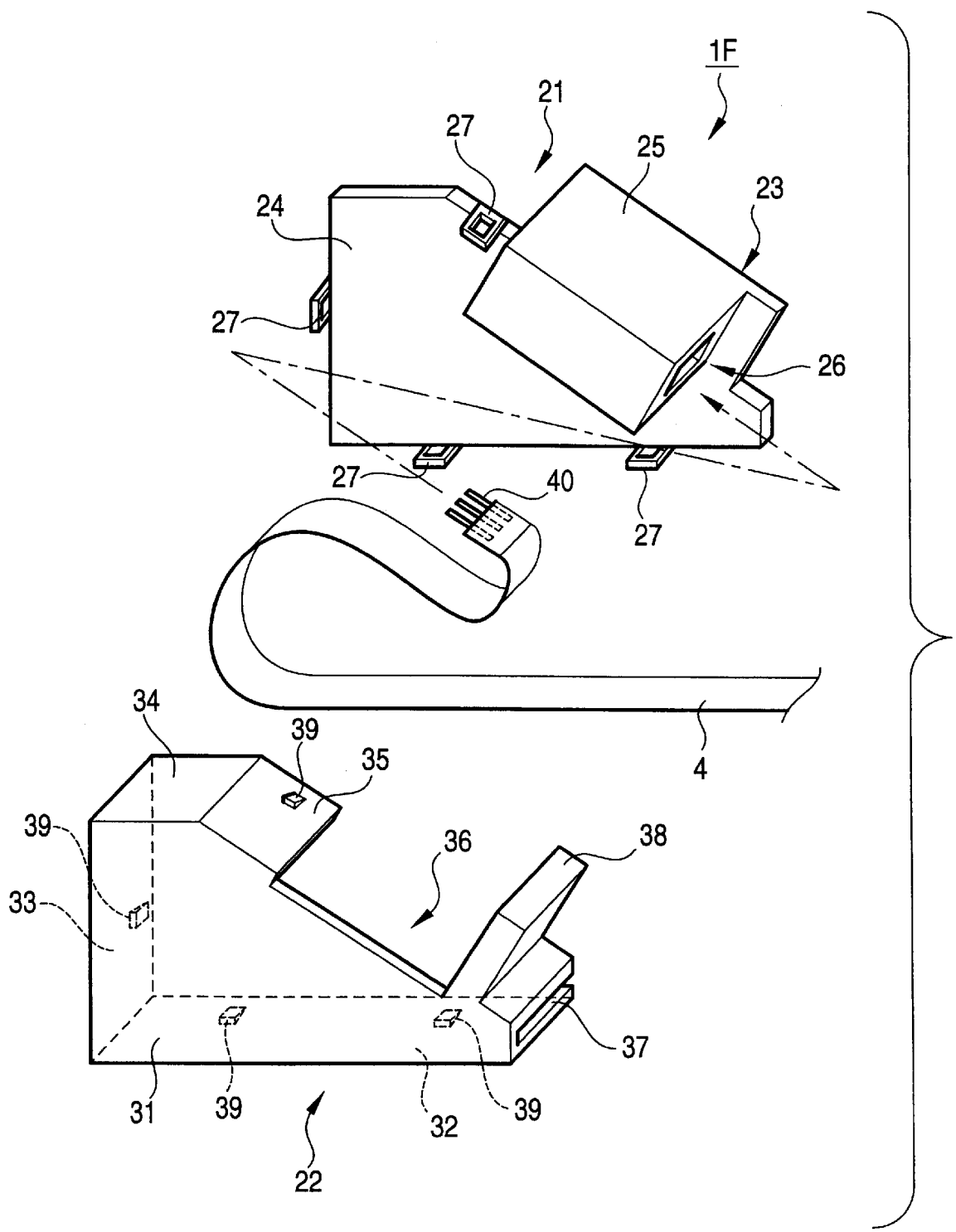
FIG. 7 is an exploded view illustrating the construction of a sixth embodiment of the apparatus for taking up the slack of a wire harness in accordance with the invention.
Figure 8:
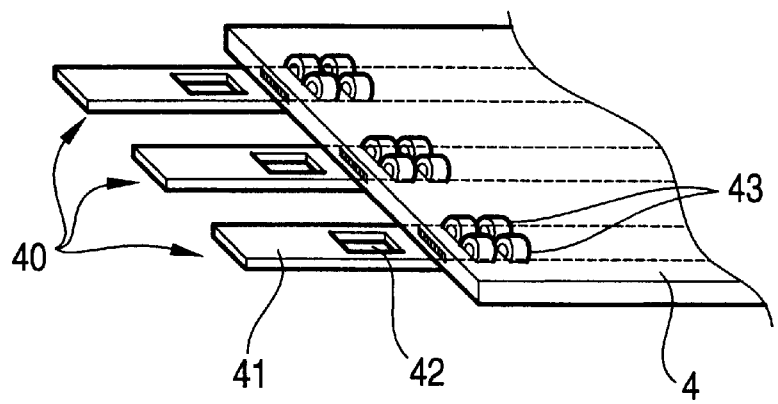
FIG. 8 is a partial perspective view illustrating connecting terminals at an end portion of the wire harness shown in FIG. 7.
Figure 9:
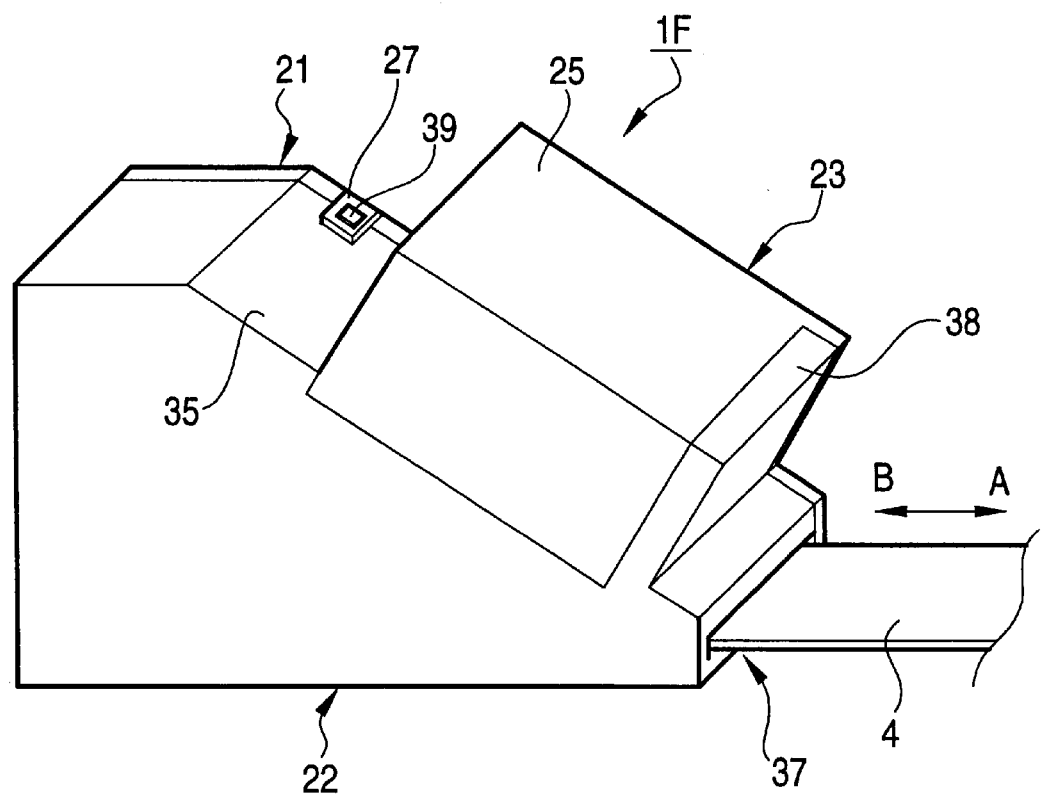
FIG. 9 is a perspective view illustrating a state of completion of assembling in FIG. 7.
Figure 10:
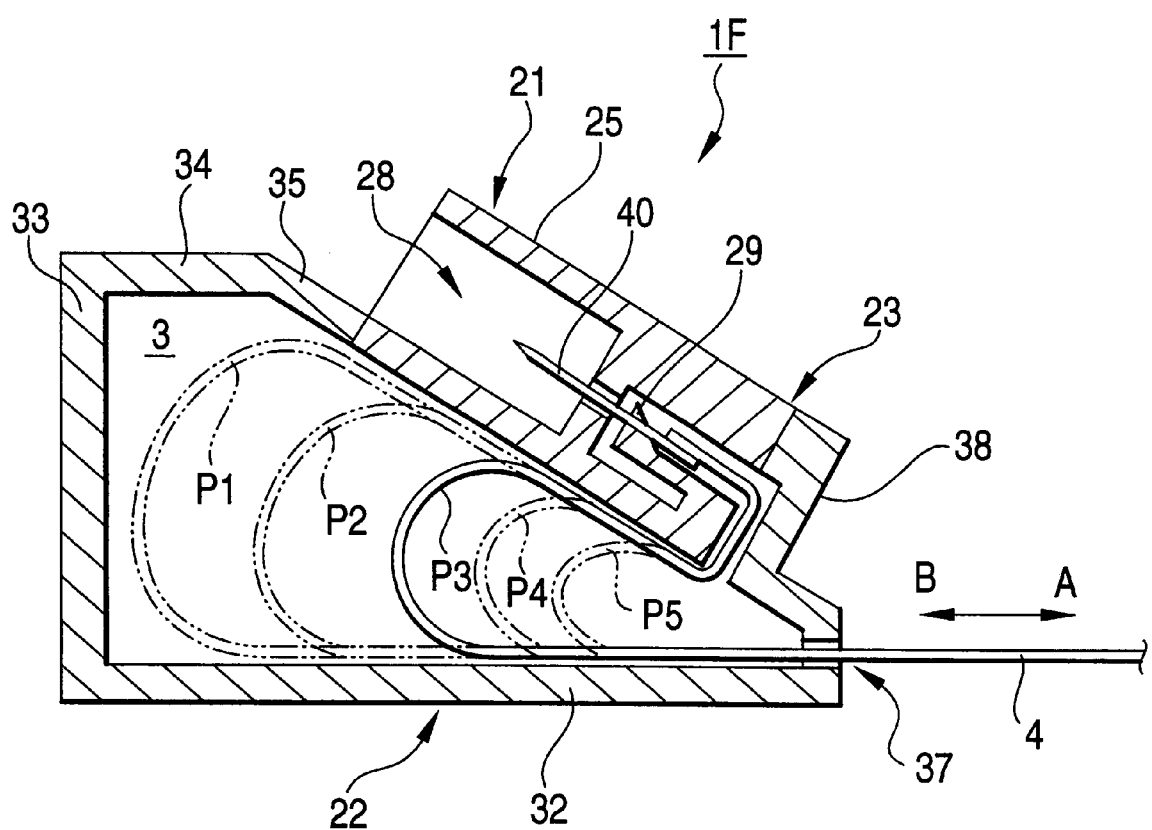
FIG. 10 is a vertical cross-sectional view illustrating the drawing out (extension) of the wire harness and the slack taking-up operation in FIG. 9.
Figure 11:
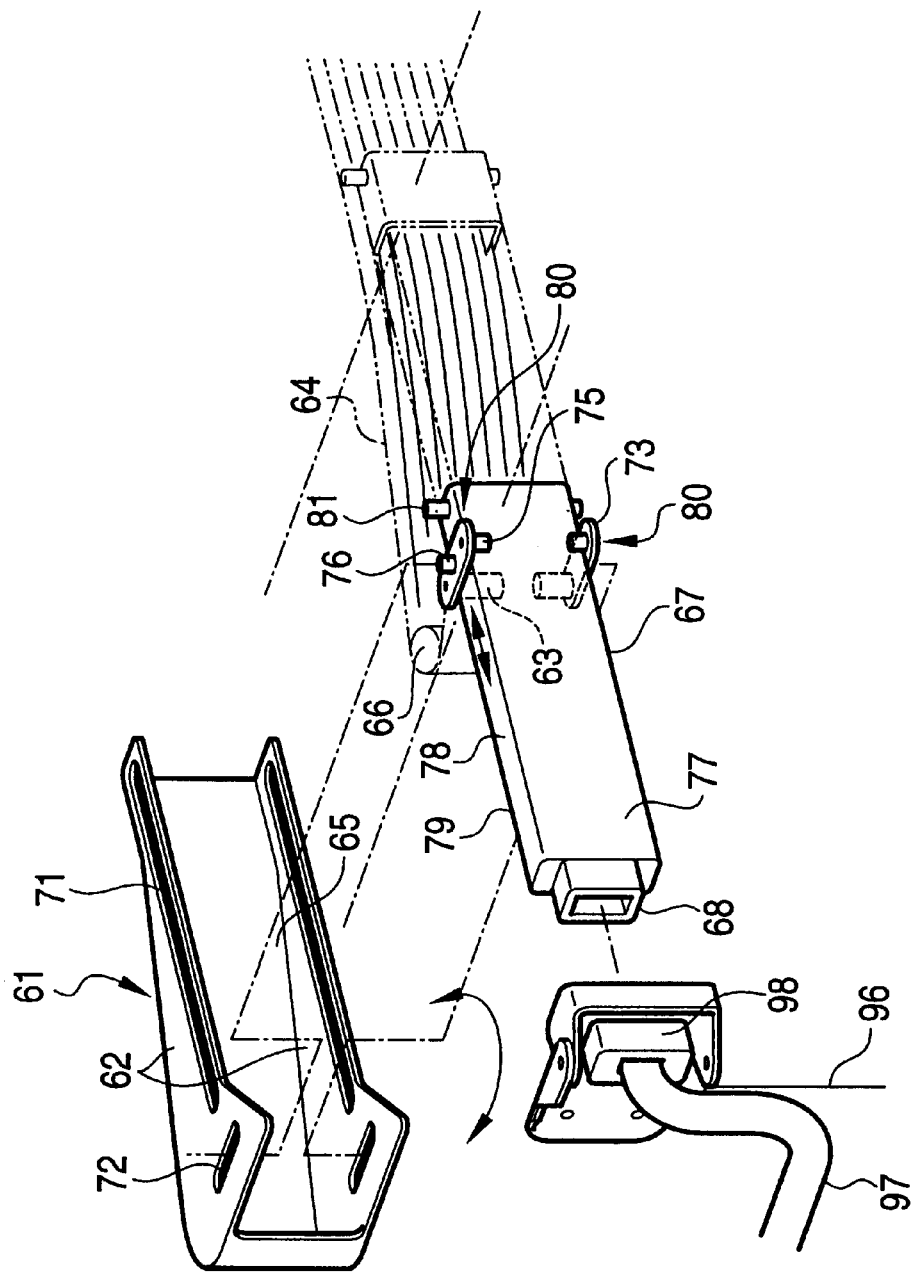
FIG. 11 is a perspective view illustrating an example of a conventional apparatus for taking up the slack of a wire harness.

Next, referring to FIGS. 7 to 10, a detailed description will be given of a sixth embodiment of the apparatus for taking up the slack of a wire harness in accordance with the invention. FIG. 7 is an exploded perspective view illustrating the apparatus for taking up the slack of a wire harness in accordance with this embodiment; FIG. 8 is a partial perspective view illustrating connecting terminals at an end portion of the wire harness shown in FIG. 7; FIG. 9 is a perspective view illustrating a state of completion of assembling in FIG. 7; and FIG. 10 is a vertical cross-sectional view illustrating the drawing out (extension) of the wire harness and the slack taking-up operation in FIG. 9. It should be noted that the major difference between this embodiment and the above-described embodiments lies in that the housing is consists of two parts, and a connector housing is integrally molded in one part.

Namely, in an apparatus 1F for taking up the slack of a wire harness in this embodiment, the housing described in the above-described embodiments is formed by a cover member 21 and a bottom member 22. In the cover member 21, a connector housing 25 is molded integrally with a flat basal portion 24 at a position where the connector housing 25 is disposed on an inclined surface of a second side plate 35, which will be described later, when the cover member 21 is fitted to the bottom member 22. A connector engaging portion 28 (see FIG. 10), with which a mating connector is engaged, is provided on the front side of the interior of the connector housing 25. A terminal accommodating chamber 26 for accommodating the connecting terminals secured to the end portion of the wire harness, which will be described later, is provided on the rear side of the connector housing 25. Further, engaging pieces 27 for fitting to the bottom member 22 are provided at four positions of the cover member 21.

In addition, the bottom member 22 is formed in the shape of a box having a substantially U-shaped cross section, and is comprised of a first side plate 32 serving as a bottom plate, a vertical side plate 33 formed so as to stand upright with respect to the first side plate 32, a top plate 34 formed so as to oppose the first side plate 32 in parallel, and the second side plate 35 formed in an inclined manner with respect to the first side plate 32. Further, a second opening 37 for leading out the wire harness 4 is provided in a state in which one side end of the bottom member 22 is notched.

In addition, the second side plate 35 is formed in such a manner as to assume a gradual downward gradient from a front end of the top plate 34 toward the second opening 37 formed on the right-hand side in the drawings, and a notch 36 for the connector housing 25 is provided in an intermediate portion of the second side plate 35. Further, a closure plate 38 for closing a rear end of the connector housing 25 is provided at an end of the notch 36. Additionally, retaining projections 39 for retaining the engaging pieces 27 during fitting are respectively provided at corresponding positions of the bottom member 22.

In addition, male connecting terminals 40 are secured to the end portion of the wire harness 4, as shown in FIG. 8. Each of the connecting terminals 40 has on its front side a connecting portion 41, has in its intermediate portion a retaining hole 42 for fixing in the terminal accommodating chamber 26, and has on its rear side crimping portions 43 for being secured to the wire harness 4. That is, both securing and electrical connection are effected by causing tips of the crimping portions 43 to pierce and penetrate the wire harness 4 from the reverse side in the drawing and by subsequently bending the crimping portions 43 inwardly and piercing a conductor portion.

Next, a description will be given of the procedure of assembling the above-described apparatus 1F for taking up the slack of a wire harness.

First, as shown in FIG. 7, the connecting terminals 40 at the end portion of the wire harness 4 are inserted in the terminal accommodating chamber 26 of the connector housing 25 molded integrally with the cover member 21. As a result, the retaining holes 42 of the connecting terminals 40 are retained by housing lances 29 (see FIG. 10) formed inside the terminal accommodating chamber 26.

Next, after the wire harness 4 is curved so as to be accommodated inside the cover member 21, the bottom member 22 is fitted to the cover member 21 from the width wise direction of the wire harness 4, thereby allowing the engaging pieces 27 of the cover member 21 to engage with the retaining projections 39 of the bottom member 22 so as to form the cover member 21 and the bottom member 22 as a unit.

At this time, a connector 23 accommodating the connecting terminals 40 is fitted in the notch 36 of the bottom member 22, the rear end of the connector housing 25 is closed by the closure plate 38, and the wire harness 4 is inserted in the second opening 37 from the lateral direction. Accordingly, the bottom member 22 can be assembled easily to the cover member 21 in the state in which the wire harness 4 is accommodated. Since the wire harness 4 can be led out from the second opening 37 at the same time as this assembling, the operational efficiency in assembly can be improved.

As shown in FIG. 10, one end of the wire harness 4 is fixed in the terminal accommodating chamber 2 6 of the connector housing 25, the other end thereof is led out from the second opening 37, and the intermediate portion thereof in the wire-harness accommodating space 3 is in surface contact with the inner side surface of the first side plate 32 in a state of being curved arcuately by the resiliency of the wire harness 4 itself. Consequently, the wire harness 4 undergoes flexural deformation in a curved manner as shown in the drawing, while urging the inner side surface of the first side plate 32 and an outer wall portion of the connector housing 25 forming an intermediate portion of the second side plate 35, which oppose each other, by the resiliency of the wire harness itself.

Accordingly, although the wire harness 4 is in surface contact with the inner side surface of the first side plate 32, the wire harness 4 is merely in contact with it by the resiliency of the wire harness 4 itself. For this reason, coupled with the fact that the gradient of the first side plate 32 with respect to the second side plate 35 is set so as to extend along the flexural deformation of the wire harness 4, the wire harness 4 is able to slide smoothly along the inner side surface of the first side plate 32.

Next, a description will be given of the operation of the above-described apparatus IF for taking up the slack of a wire harness.

As shown in FIG. 10, when a free end of the wire harness 4 is drawn out in the direction of the arrow A, the wire harness 4 in terms of its bulged state undergoes gradual reduction in its radius from the position P1 in the order of the positions P2, P3, P4, and P5. Namely, the wire harness 4 which was initially curved largely at the position P1 on the left-hand side in the drawing is drawn out smoothly while applying an appropriate urging force to the first side plate 32 as the radius of the curved portion is gradually reduced as shown at the positions P2, P3, P4, and P5. At this time, the sliding portion of the wire harness 4 initially moves while lightly coming into surface contact with the inner side surface by the resiliency of the wire harness itself, and its urging force with respect to the inner side surface gradually increases as the radius of the curved portion is reduced.

Next, when the wire harness 4 is pushed in the direction of the arrow B, the wire harness 4 is pushed into the wire-harness accommodating space 3 through the second opening 37. Consequently, the wire harness 4 gradually bulges largely in the order of the positions P4, P3, P2, and P1 from the position P5 contrary to the time of drawing out, and the slack of the wire harness 4 is taken up into the wire-harness accommodating space 3 in correspondence with this bulging. At this time, since the radius of the curved portion undergoes transition from the state of reduced radius to the state of enlarged radius as described above, the wire harness 4 is returned rapidly by a large restoring force in the initial state, and is subsequently returned gradually slowly.

Accordingly, the wire harness 4 is taken up in the wire-harness accommodating space 3 without slackening between the vehicle body and the door, and it is possible to prevent the disconnection due to the pinching of the wire harness 4, short-circuit due to the exfoliation or the like of the sheath portion, and the like. Hence, it is possible to obtain a highly reliable apparatus for taking up the slack of a wire harness.

In addition, since it is unnecessary to provide a fixing member for the wire harness, and a member for attaching the connector for connection to the wire harness is also unnecessary, it is possible to reduce the number of component parts, thereby making it possible to attain reduction in cost.

As described above, in the apparatus for taking up the slack of a wire harness in accordance with the invention, the second opening of the housing is formed at an end portion of the housing where a first side plate for forming a bottom surface of the housing and a second side plate for forming an inclined surface are brought close together; the second side plate is formed in such a manner as to gradually approach the first side plate from a first opening side toward the second opening; and the extension of the wire harness and the taking up of the slack of the wire harness are effected in a state in which the wire harness in the housing is in resiliently sliding contact with an inner side surface of the first side plate or the second side plate as an end portion of the wire harness led out from the second opening is drawn out or pushed in.

In addition, in the above-described apparatus for taking up the slack of a wire harness, a portion of the wire harness led out from the first opening is secured to the inner side surface of the first side plate, and the end portion thereof is folded back toward the first opening side and is turned back in a curved state toward a second opening side, so as to allow a portion of the wire harness to be brought into resilient contact with the inner side surface of the second side plate.

Accordingly, when the led-out end portion of the wire harness is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the second side plate. Thus, the wire harness of the length corresponding to this reduced-radius portion is drawn out from the housing, thereby extending the wire harness smoothly.

In addition, when the drawn-out end portion of the wire harness is pushed in, the radius of the curved portion of the wire harness whose diameter has been reduced in the housing is enlarged to its original state by the restoring force based on the resilient action of the wire harness itself in a state in which the curved portion of the wire harness is in resiliently sliding contact with the inner side surface of the second side plate. Thus the wire harness is taken up into the housing in correspondence with the enlarged-radius portion, thereby smoothly effecting the taking up of the slack.

Namely, the wire harness in the reduced-radius state has a large restoring force due to the resilient action of the wire harness itself as compared with the wire harness in an enlarged-radius state, and the force for pulling the wire harness into the housing increases. Accordingly, the wire harness does not slacken outside the housing, and when the wire harness is pushed in, the slack can be taken up smoothly into the housing. Additionally, it is possible to prevent the disconnection of the wire harness, the short circuit due to the exfoliation or the like of the sheath portion, and the like. Hence, it is possible to obtain a high reliable apparatus for taking up the slack of a wire harness.

In addition, since the wire harness is curved inside the housing by the resiliency of the wire harness itself, and is in contact with the first and second side plates by fixed urging forces, abnormal noise does not occur due to vibrations and the like. Since the structure is simple and a member such as a spring is not required at all, it is possible to attain reduction in cost.

In addition, in the above-described apparatus for taking up the slack of a wire harness, a portion of the wire harness led out from the first opening is secured to the inner side surface of the second side plate, and the end portion thereof is folded back toward the first opening side and is turned back in a curved state toward a second opening side, so as to allow a portion of the wire harness to be brought into resilient contact with the inner side surface of the first side plate.

Accordingly, since the wire harness on the second side plate side close to the introducing side is secured, the first side plate forms an inclined surface with respect to the second side plate. Thus, when the led-out end portion of the wire harness is drawn out of the housing through the second opening, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the first side plate. Hence, the wire harness is extended smoothly.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surface of the first side plate. Thus, the slack of the wire harness is taken up smoothly into the housing.

In addition, in the above-described apparatus for taking up the slack of a wire harness, the second opening also serves as the first opening, and a portion of the wire harness led out from the second opening is secured to the inner side surface of the first side plate, and is turned back in a curved state toward a second opening side inside the housing, so as to allow a portion of the wire harness to be brought into resilient contact with the inner side surface of the second side plate and to be led out from the second opening.

Accordingly, since the introduction and the leading out of the wire harness are effected through a single opening in terms of the construction of the housing, the degree of freedom in the installation of the housing enhances, and the housing can be made compact so as to be applicable to a narrow installation space, thereby making it possible to obtain an apparatus for taking up the slack of a wire harness which excels in versatility.

Furthermore, since the wire harness has no turned-back portion where the curvature of bending is nil, the processing of the wire harness itself is unnecessary, making it possible to improve the productivity.

In addition, in the above-described apparatus for taking up the slack of a wire harness, the second opening also serves as the first opening, and a portion of the wire harness led out from the second opening is turned back in a curved state toward a second opening side without being secured inside the housing, so as to allow the wire harness to be brought into resilient contact with the inner side surfaces of the first side plate and the second side plate and to be led out from the second opening, the extension of the wire harness and the taking up of the slack of the wire harness being effected by the drawing out and the pushing in of both or either one of an introduced end and a led-out end of the wire harness.

Accordingly, since the introduction and the leading out of the wire harness are effected through a single opening in terms of the construction of the housing, and the wire harness is not secured and has no turned-back portion where the curvature of bending is nil, it is possible to enhance the degree of freedom in the installation of the housing, make the housing compact, provide outstanding versatility, and further improve the productivity.

In addition, in the apparatus for taking up the slack of a wire harness in accordance with the invention, the second opening also functions as the first opening, and a pair of side plates forming inclined surfaces are disposed in face-to-face relation to each other so as to gradually approach each other toward a second opening side; and the extension of the wire harness and the taking up of the slack of the wire harness are effected in a state in which the wire harness in the housing is in resiliently sliding contact with inner side surfaces of the side plates as both or either one of portions of the wire harness introduced through and led out from the second opening is drawn out or pushed in.

Accordingly, the wire harness in the housing is in resilient contact with the inner side surfaces of the two side plates. As both or either one of both end portions of the wire harness led out from the second opening is drawn out, the curved portion of the wire harness moves in the direction of the second opening against the resilient action of the wire harness itself and while undergoing reduction in its radius in a state in which the curved portion of the wire harness is in resiliently sliding contact with the inner side surfaces of the two side plates. Thus, the wire harness is extended smoothly.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surfaces of the two side plates. Thus, the slack of the wire harness is taken up smoothly.

Namely, the wire harness in the reduced-radius state has a large restoring force due to the resilient action of the wire harness itself as compared with the wire harness in an enlarged-radiusstate, and the force for pulling the wire harness into the housing increases. Accordingly, the wire harness does not slacken outside the housing, and when the wire harness is pushed in, the slack can be taken up smoothly into the housing. Additionally, it is possible to prevent the disconnection of the wire harness, the short circuit due to the exfoliation or the like of the sheath portion, and the like. Hence, it is possible to obtain a high reliable apparatus for taking up the slack of a wire harness.

In addition, since the wire harness is curved inside the housing by means of the resiliency of the wire harness itself, and is in contact with the first and second side plates by fixed urging forces, abnormal noise does not occur due to vibrations and the like, and since the structure is simple and a member such as a spring is not required at all, it is possible to attain reduction in cost.

Furthermore, since the introduction and the leading out of the wire harness are effected through a single opening in terms of the construction of the housing, and the wire harness is not secured in the housing and has no turned-back portion where the curvature of bending is nil, it is possible to enhance the degree of freedom in the installation of the housing, make the housing compact, provide outstanding versatility, and improve the productivity.

In addition, in the above-described apparatus for taking up the slack of a wire harness, the second opening of the housing is formed at an end portion of the housing where a first side plate for forming a bottom surface of the housing and a second side plate for forming an inclined surface are brought close together; the second side plate is formed in such a manner as to gradually approach the first side plate toward the second opening from an end portion of a top plate formed so as to oppose the first side plate; connecting terminals are provided at an end portion of the wire harness led out from the first opening, and a connector housing in which the connecting terminals are fixed in a terminal accommodating chamber is molded integrally on an outer side of the housing; and the extension of the wire harness and the taking up of the slack of the wire harness are effected in a state in which the wire harness in the housing is in resiliently sliding contact with an inner side surface of the first side plate as an end portion of the wire harness led out from the second opening is drawn out or pushed in.

Accordingly, when the led-out end portion of the wire harness is drawn out, the curved portion of the wire harness in the housing moves in the direction of the second opening against the resilient action of the wire harness itself and while undergoing reduction in its radius in a state in which the curved portion of the wire harness is in resiliently sliding contact with the inner side surface of the first side plate. Thus, the wire harness of the length corresponding to this reduced-radius portion is drawn out from the housing, thereby extending the wire harness.

In addition, when the drawn-out end portion of the wire harness is pushed in, the radius of the curved portion of the wire harness whose diameter has been reduced in the housing is enlarged to its original state by means of the restoring force based on the resilient action of the wire harness itself in a state in which the curved portion of the wire harness is in resiliently sliding contact with the inner side surface of the first side plate. Thus the wire harness is taken up into the housing in correspondence with the enlarged-radius portion, thereby effecting the taking up of the slack. Accordingly, abnormal noise does not occur due to the vibrations and the like, and when the wire harness is pushed in, the slack can be taken up smoothly into the housing.

Further, since the connecting terminals are provided at an end portion of the wire harness led out from the first opening, and the connector housing in which the connecting terminals are fixed in the terminal accommodating chamber is molded integrally on the outer side of the housing, it is unnecessary to provide a fixing member for the wire harness, in the vicinity of the first opening, and a member for attaching the connector for connection to the wire harness is also unnecessary. Therefore, it is possible to reduce the number of component parts, thereby making it possible to attain reduction in cost.

In addition, in the above-described apparatus for taking up the slack of a wire harness, the housing is comprised of a cover member with which the connector housing is molded integrally and a bottom member for forming the wire-harness accommodating space by being fitted to the cover member from a widthwise direction of the wire harness.

Accordingly, the housing is comprised of two component parts including the cover member and the bottom member. After the connecting terminals at the end portion of the wire harness are fixed in the terminal accommodating chamber inside the connector housing molded integrally on the cover member, the wire harness is curved so as to be accommodated within the housing. Next, as the bottom member is fitted to the cover member from the width wise direction of the wire harness, the bottom member can be easily assembled to the cover member in a state in which the wire harness is accommodated, and the wire harness can be led out from the second opening at the same time as the fitting. Accordingly, it is possible to improve the assembling operation.

In addition, in the above-described apparatus for taking up the slack of a wire harness, since the connector housing is molded integrally on an inclined surface of the second side plate, the space for installing the overall apparatus, including the space for engaging with the mating connector, is not made large and can be minimized.

What is claimed is:

1. An apparatus for taking up a slack of a wire harness comprising:
   a housing including a first side plate forming a bottom surface thereof and a second side plate forming an inclined surface thereof;
   a wire harness accommodating space for accommodating the wire harness in a curved state inside the housing;
   a first opening for passing the wire harness therethrough formed in the housing; and
   a second opening for passing the wire harness therethrough formed in a position of the housing in which the first side plate and the second plate are brought close together, the second side plate being formed so as to gradually approach the first side plate toward the second opening,
   wherein the wire harness and the housing are configured so that substantially all wire harness slack that is taken up and drawn out of the housing is in resiliently sliding contact with an inner surface of at least one of the first side plate and the second side plate and an end portion of the wire harness is led out from the second opening, so that an extension of the wire harness and a resilient taking up of the slack of the wire harness are executed as the end portion of the wire harness is drawn out or pushed in.

2. An apparatus for taking up a slack of a wire harness comprising:
   a housing including a first side plate forming a bottom surface thereof and a second side plate forming an inclined surface thereof;
   a wire harness accommodating space for accommodating the wire harness in a curved state inside the housing;
   a first opening for passing the wire harness therethrough formed in the housing; and
   a second opening for passing the wire harness therethrough formed in a position of the housing in which the first side plate and the second plate are brought close together, the second side plate being formed so as to gradually approach the first side plate toward the second opening, wherein the wire harness is accommodated in the housing so that the wire harness is in resiliently sliding contact with an inner surface of at least one of the first side plate and the second side plate and an end portion of the wire harness is led out from the second opening, so that an extension of the wire harness and a taking up of the slack of the wire harness are executed as the end portion of the wire harness is drawn out or pushed in, and wherein a portion of the wire harness inside the wire harness accommodating space is partially secured to the inner surface of the first side plate, and a contiguous portion of the wire harness is folded back toward the first opening and is turned back in the curved state toward the second opening, so as to allow a portion of the wire harness to be brought into resilient contact with the inner surface of the second side plate.

3. An apparatus for taking up a slack of a wire harness comprising:

a housing including a first side plate forming a bottom surface thereof and a second side plate forming an inclined surface thereof;

a wire harness accommodating space for accommodating the wire harness in a curved state inside the housing;

a first opening for passing the wire harness therethrough formed in the housing; and a second opening for passing the wire harness therethrough formed in a position of the housing in which the first side plate and the second plate are brought close together, the second side plate being formed so as to gradually approach the first side plate toward the second opening, wherein the wire harness is accommodated in the housing so that the wire harness is in resiliently sliding contact with an inner surface of at least one of the first side plate and the second side plate and an end portion of the wire harness is led out from the second opening, so that an extension of the wire harness and a taking up of the slack of the wire harness are executed as the end portion of the wire harness is drawn out or pushed in, and wherein a portion of the wire harness inside the wire harness accommodating space is partially secured to the inner surface of the first side plate, and a contiguous portion of the wire harness is folded back toward the first opening and is turned back in a curved state toward the second opening, so as to allow a portion of the wire harness to be brought into resilient contact with the inner surface of the first side plate.

4. The apparatus for taking up the slack of the wire harness according to claim 1, wherein the first and second openings are formed integrally to form an opening.

5. An apparatus for taking up a slack of a wire harness comprising:

a housing including a first side plate forming a bottom surface thereof and a second side plate forming an inclined surface thereof;

a wire harness accommodating space for accommodating the wire harness in a curved state inside the housing;

a first opening for passing the wire harness therethrough formed in the housing; and a second opening for passing the wire harness therethrough formed in a position of the housing in which the first side plate and the second plate are brought close together, the second side plate being formed so as to gradually approach the first side plate toward the second opening, wherein the wire harness is accommodated in the housing so that the wire harness is in resiliently sliding contact with an inner surface of at least one of the first side plate and the second side plate and an end portion of the wire harness is led out from the second opening, so that an extension of the wire harness and a taking up of the slack of the wire harness are executed as the end portion of the wire harness is drawn out or pushed in, wherein the first and second openings are formed integrally to form an opening, and wherein a portion of the wire harness inside the wire harness accommodating space is partially secured to the inner surface of the first side plate, and a contiguous portion of the wire harness is folded back toward the first opening, and is turned back in a curved state toward the second opening, so as to allow a portion of the wire harness to be brought into resilient contact with the inner surface of the first side plate.

6. An apparatus for taking up a slack of a wire harness comprising:

a housing including a first side plate forming a bottom surface thereof and a second side plate forming an inclined surface thereof;

a wire harness accommodating space for accommodating the wire harness in a curved state inside the housing;

a first opening for passing the wire harness therethrough formed in the housing; and a second opening for passing the wire harness therethrough formed in a position of the housing in which the first side plate and the second plate are brought close together, the second side plate being formed so as to gradually approach the first side plate toward the second opening, wherein the wire harness is accommodated in the housing so that the wire harness is in resiliently sliding contact with an inner surface of at least one of the first side plate and the second side plate and an end portion of the wire harness is led out from the second opening, so that an extension of the wire harness and a taking up of the slack of the wire harness are executed as the end portion of the wire harness is drawn out or pushed in, wherein the first and second openings are formed integrally to form an opening, and wherein a portion of the wire harness passed through the first opening is folded back toward the first opening and is turned back in a curved state toward the second opening, so as to allow the wire harness to be brought into resilient contact with the inner surface of the first side plate and the second side plate and to be passed through the second opening, the extension of the wire harness and the taking up of the slack of the wire harness being executed by the drawing out and the pushing in of both or either one of the opposite ends of the wire harness.

7. An apparatus for taking up a slack of a wire harness comprising:

a housing;

a wire harness accommodating space for accommodating the wire harness in a curved state inside the housing;

an opening for passing the wire harness therethrough formed in the housing; and a pair of side plates forming inclined surfaces opposed to each other with respect to the opening so as to gradually approach each other toward the opening, wherein the wire harness and the housing are configured so that substantially all wire harness slack that is taken up and drawn out of the housing is in resiliently sliding contact with an inner surface of at least one of a first side plate and a second side plate of the pair of side plates, and an end portion of the wire harness is led out from the opening, so that an extension of the wire harness and a taking up of the slack of the wire harness are executed as opposite ends of the wire harness are drawn out or pushed in.

8. An apparatus for taking up a slack of a wire harness comprising:

a housing including a bottom member and a cover member connectable to the bottom member;

the bottom member including a first side plate forming a bottom surface of the housing and a second side plate forming an inclined surface of the housing;

a wire harness accommodating space for accommodating the wire harness in a curved state inside of the housing;

a first opening for passing and securing the wire harness therethrough formed in the bottom member;

a second opening for passing the wire harness therethrough formed in a position of the housing in which the first side plate and the second plate are brought close together, the second side plate being formed so as to gradually approach the first side plate toward the second opening;

connecting terminals provided at an end of the wire harness passed through the first opening, and a connector housing formed in the cover member, wherein the connecting terminals are fixed in a terminal accommodating chamber therein, wherein the wire harness is accommodated in the housing so that the wire harness is in resiliently sliding contact with an inner surface of at least one of the first side plate and the second side plate and an end portion of the wire harness is led out from the second opening, so that an extension of the wire harness and a taking up of the slack of the wire harness are executed as the end portion of the wire harness is drawn out or pushed in.

9. The apparatus for taking up the slack of the wire harness according to claim 8, wherein the cover member with which the connector housing is molded integrally is engaged with the bottom member from the width wise direction of the wire harness to form the wire harness accommodating space in cooperation with the bottom member.

10. The apparatus for taking up the slack of the wire harness according to claim 8, wherein the connector housing is formed on the inclined surface of the second side plate.

* * * * *